July 3, 1934.  W. W. MACFARREN  1,965,523
ROTARY FLYING SHEAR
Filed April 11, 1929   5 Sheets-Sheet 1

INVENTOR

Walter W. Macfarren

FIG. 3

Patented July 3, 1934

1,965,523

UNITED STATES PATENT OFFICE 1,965,523

ROTARY FLYING SHEAR

Walter W. Macfarren, Oakmont, Pa.

Application April 11, 1929, Serial No. 354,414

30 Claims. (Cl. 164—68)

My invention relates to rotary flying shears for cutting metal bars in motion endwise.

My improved shear comprises broadly, a frame, a pair of parallel cylinders or drums mounted in the frame to rotate about fixed centers, and geared together to obtain the same surface speed, and cutting knives on the drums in cooperative relation and normally inoperative.

The drums need not be of the same diameters, although usually they would be.

The knives are arranged in pairs, one of a pair on each drum in such relation that they may cut the material at one point in their revolution, and one or both of the knives have a radial or other adjustment by which they are normally inoperative, but can be made operative at will.

It will be further noted that both drums revolve normally at the surface speed of the bar to be cut—the bar passing between them, and the apparatus is thus always in readiness to make a cut.

If the knives are spaced circumferentially around the drums, say two feet apart, and each pair of knives may be made to cut when desired, it is evident that sections can be cut off the material as it passes between the drums, in any length which is a multiple of two feet.

The present invention is similar and supplementary to a previous application for Rotary flying shears filed March 18, 1929, and bearing Serial No. 347,902.

The present invention includes special driving mechanism by the use of which it is possible to cut in multiples of the knife spacing, plus or minus a predetermined amount.

Such shears may be classified according to use as follows:

1st. Whether for hot or cold cutting. When cold metal is cut the shear will be stronger than for an equivalent section of hot metal, and the speeds will usually be less.

2nd. Whether for thick or thin material. Shears of this type are best adapted for comparatively thin material although any thickness can be cut if the knife drums are of large enough diameter. Material below $\frac{1}{16}$" thick may be cut with a 6" diameter drum—for $\frac{1}{2}$" thick drums 3 to 4 ft. diameter may be used and for a thickness of 3" the drums might need to be 10 ft. diameter or more. It is evident that thin material can be cut at very high speeds—say up to 3000 ft. per minute or more as the shock is not great, but on thick material especially if cut cold, the speed would have to be much less.

3rd. Shears for wide or narrow stock. If the thickness is the same an increase in width merely increases the power required up to a point where the drums are not sufficiently rigid when the drum diameter must be increased.

4th. Shears for round or square stock, ovals— diamonds or other sections. While my improved machine is better adapted for cutting flat stock any section may be cut with a proper design of machine which is not thicker than the thickest flat stock which could be conveniently handled.

5th. Speed of cutting. Speeds below 300 ft. per minute may be classed as low speeds, speeds between 300 and 1200 ft. per minute may be classed as medium speeds, and speeds from 1200 to 3500 ft. per minute may be classed as high speeds. The speed of the bar on which the shear must operate exerts a controlling influence on the design and arrangement of the machine. For thin stock not too wide very high speeds may be used if desired; for medium thicknesses the speed must be reduced, and for thick sections the speeds must be lower. The allowable speeds are also affected by the temperature and tenacity of the material.

6th. Single or multiple cuts. Some flying shears are used to make single cuts occasionally, as for instance, between the stands of a continuous bar mill to crop off the front end of the bars to remove bad ends or to cut a long bar once at about its middle point so it may be handled on a shorter hot bed. As no accuracy of spacing is required for either of these uses, such a shear may be built according to my invention with but a single pair of knives, one knife being mounted on each drum and normally inoperative but in constant rotation and ready for use when needed. When the shear is required to make spaced cuts to subdivide the bar into a number of equal sections (of course with end crops) the machine assumes a very different and more complicated form although embodying the same basic principle.

7th. Shears for spaced cuts may be built to cut in multiples of the knife spacing which makes a comparatively simple machine, or the shear may be required to cut any length sections between limits as for instance any length between 10 and 40 ft. varying by $\frac{1}{4}$" which requires additional refinements of design.

8th. Cutting to exact lengths. Instead of an allowance of $\frac{1}{4}$" on the length of the sections cut, the shear may be required to cut accurately to $\frac{1}{32}$" or even to 1/1000".

9th. Shears cutting material in the mill rolls and out of them. Usually flying shears are required to cut the material while it is engaged by the mill rolls in the act of being rolled. In this case, the shears may be driven by a separate motor or be gear driven from the mill.

When driven by a separate motor, the shear can only cut to approximate lengths as both the mill speed and the speed of the shear motor will vary, and probably can not be kept closer than within 5% of each other. A 5% variation on a 10 foot section is 1.2 inches.

To obtain any degree of accuracy as to the lengths of cut, the shear must be gear driven from the mill.

If however the piece to be cut is a long bar from a hot bed of a stock pile, or a coil or strip material, it may be passed through a pair of pinch rolls in geared connection with the shear, and driven from the shear driving motor, and very accurate lengths may be thus cut.

It is further evident that even with a shear driven from the mill, there are two additional variables which must be considered:

1st. The rolls become smaller in use and thus change the delivery speed of the bar—this change may amount to 20%.

2nd. If the knives are spaced a fixed distance apart on the drums as they must be, the cold length of a bar cut hot will vary with the temperature of rolling. It will be shown later how corrections can be made for these variables.

10th. My improved shear may be built as a single machine with two drums as before stated, or as a tandem machine comprising two single units, with means for adjusting the distance between them. The results of this construction will be discussed later.

From the preceding remarks, it will be seen that a variety of constructions are necessary to meet the various conditions under which a flying shear may be used. However, the basis of my invention is the double drum machine with spaced disappearing knives, and the same will now be described in detail.

Referring to the drawings.

Figure 1:
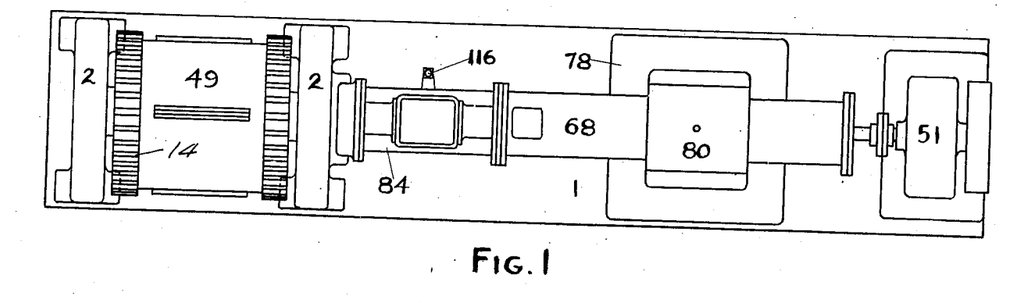
Figure 1 is a plan view of a complete machine with its own motor.
Figure 2:
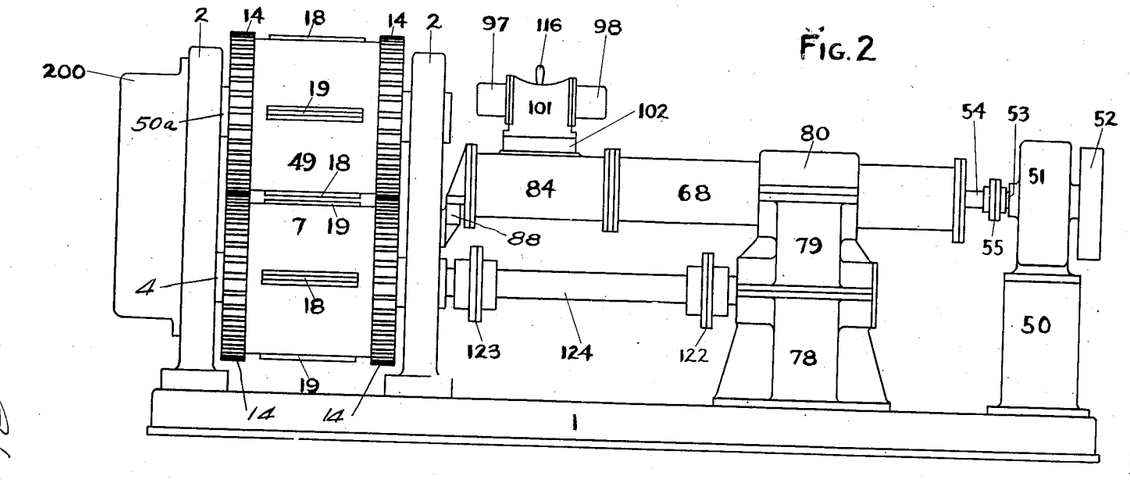
Fig. 2 is an elevation of the same.
Figure 3:
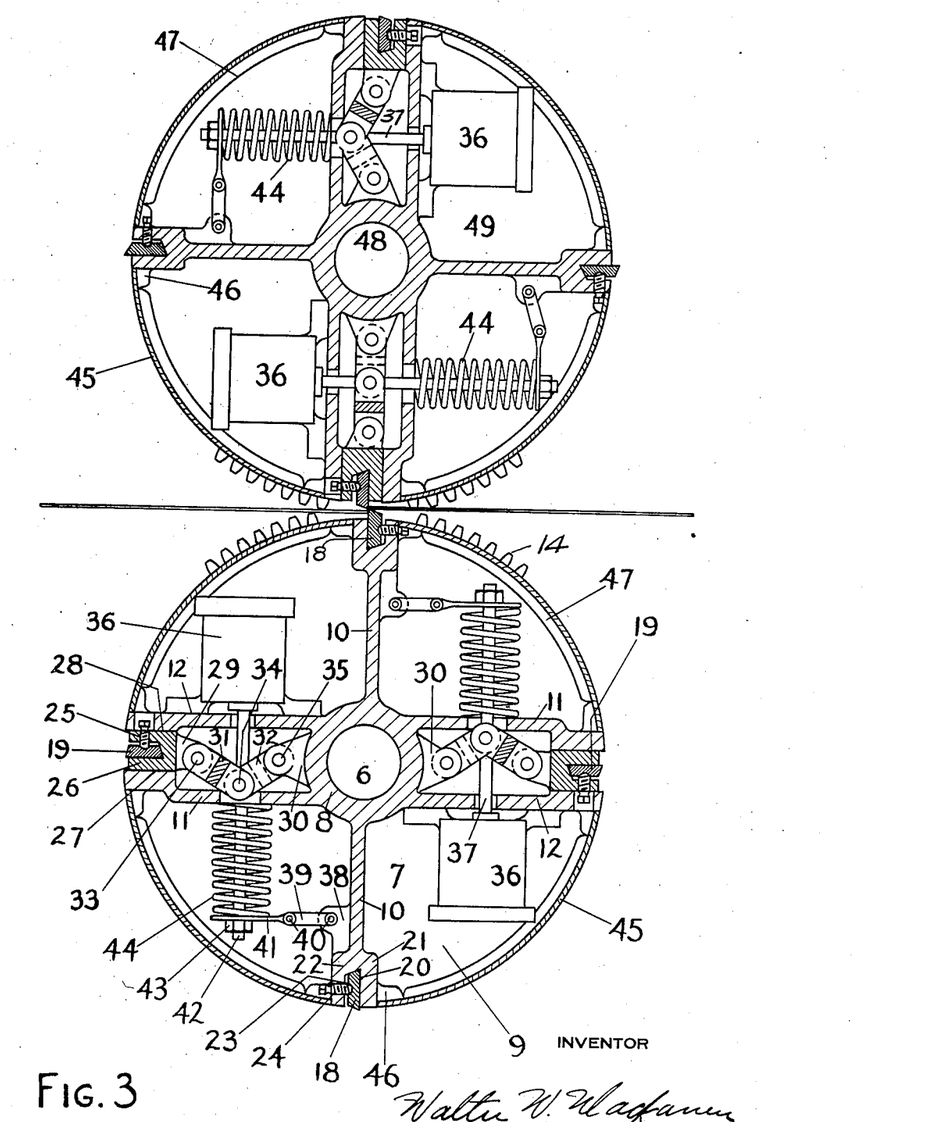
Fig. 3 is a vertical cross section through the knife drums showing the operation of the knives.

Referring to Figs. 1, 2, and 3, the bottom frame member or base plate 1 may rest on a foundation, or other support. The housings or side members 2, are securely fastened to the base plate 1, and are provided with rigidly-mounted lower bearings to support the lower drum shaft 6.

The lower drum shaft 6, carries the lower drum 7.

The drum 7 has a central barrel or hub 8 surrounding the shaft 6, two end webs 9, the ribs 10 (vertical in lower drum of Fig. 3), two ribs 11, and two ribs 12 (horizontal as shown in lower drum Fig. 3).

The barrel 8, end webs 9, and ribs 10, 11 and 12, form a one piece casting as shown, but obviously the structure may be subdivided and joined to suit the conditions required.

Gear rims 13 are also cast integral with the webs 9, and teeth 14 are formed on the rims 13, thus forming two equal gears, one at each end of the lower drum 7.

The teeth 14 mesh with similar teeth on the upper drums. The lower drum 7 carries two fixed knives 18, and two movable knives 19. Each fixed knife 18 is mounted in a slot 20, formed between the branches 21 and 22, of one of the ribs 10.

The knives 18 and 19 are shown with beveled edges although this precise form is not essential. A central shallow groove 23 is formed in each knife, for the whole or a portion of its length, and a series of several set screws 24 are tapped through the ribs 22, and have their inner ends seated in the groove 23.

The movable knives 19 are duplicates of the fixed knives 18, and are held by similar set screws 25. The movable knives 19 are each mounted in a sliding knife holder 26, which is guided for radial movement between the finished surfaces 27 and 28, on the ribs 11, and 12, respectively.

Each knife holder 26 is provided with a series of lugs 29. A similar set of lugs 30 is formed on the barrel 8. Links 31 and 32, and pins 33, 34, and 35, form a toggle joint for each sliding knife holder 26. A number of electro magnets 36, usually two or more for each knife holder 26, are secured to the ribs 12; and each magnet 36 is connected to the middle toggle pin 34, by an eye bolt or link 37.

The links 31 and 32 are in one piece, and the pins 33, 34, and 35, may be as long as the knife holder 26. Thus, any one magnet may operate its connected knife holder 26; the reason for having a number of magnets being that the same total pull can be divided among a number of small magnets which will work into the available space to better advantage than a single large magnet. It will be seen later that in some cases it will be preferable to use air cylinders instead of magnets, and broadly speaking the parts designated by 36 may be either air cylinders or magnets.

Several lugs 38 are formed on each rib 10, and links 39 connect the lugs 38 with spring plates 41, by means of small pins 40. An eye bolt 42 engages the middle toggle pin 34, and has a nut 43 outside of the spring plate 41. A helical spring 44 is mounted over the bolt 42, and between the rib 11 and the spring plate 41. There are preferably four or more springs 44, for each movable knife holder 26. As many may be used as required to obtain the desired quick movement.

Detachable curved cover plates 45 are secured to lugs 46, and intermediate stiffening ribs 47 may be provided if necessary. The upper drum 49 is mounted on a shaft 48, and may be an exact duplicate of the lower drum 7.

The shaft 48 is supported in bearings 50a, similar to bearings 4, and carried by the housings 2. As thus described, the operating parts comprise two parallel drums, rotating on fixed centers, and each provided with two fixed and two movable knives.

It will be noted that each movable knife cooperates with a fixed knife on the other drum, and vice versa. It is obvious that all the knives could be made movable, if desired, but this would involve additional cost, and be difficult to work into the available space.

It is also obvious that all the movable knives could be placed on one drum, and all the fixed knives on the other drum, but the advantages of the construction shown will be readily apparent.

It will be noted that when in operation the drums revolve normally at the same surface speed as the bar to be cut, and that all the movable knives are normally retracted, as shown in Fig. 3 at the two side positions for lower drum 7, and at the top position for upper drum 49.

The springs 44 hold the movable knife holders in their inner and non-operative position indefinitely until a set of magnets is supplied with current, when the knife connected thereto is forced out by the toggle action into cutting relation with the cooperating fixed knife on the other drum.

Assuming for the moment that the knife magnets can be energized as desired, so that the knives can be brought into action in any desired sequence, it is obvious that with this arrangement, insofar as described, sections or portions can be cut from the moving bar having a length equal to any multiple of the pitch (circumferential spacing) of the knives.

Thus if the knife pitch is two feet, sections of any even length can be cut above two feet, as 2—4—6—8—10—100.

Figure 4:
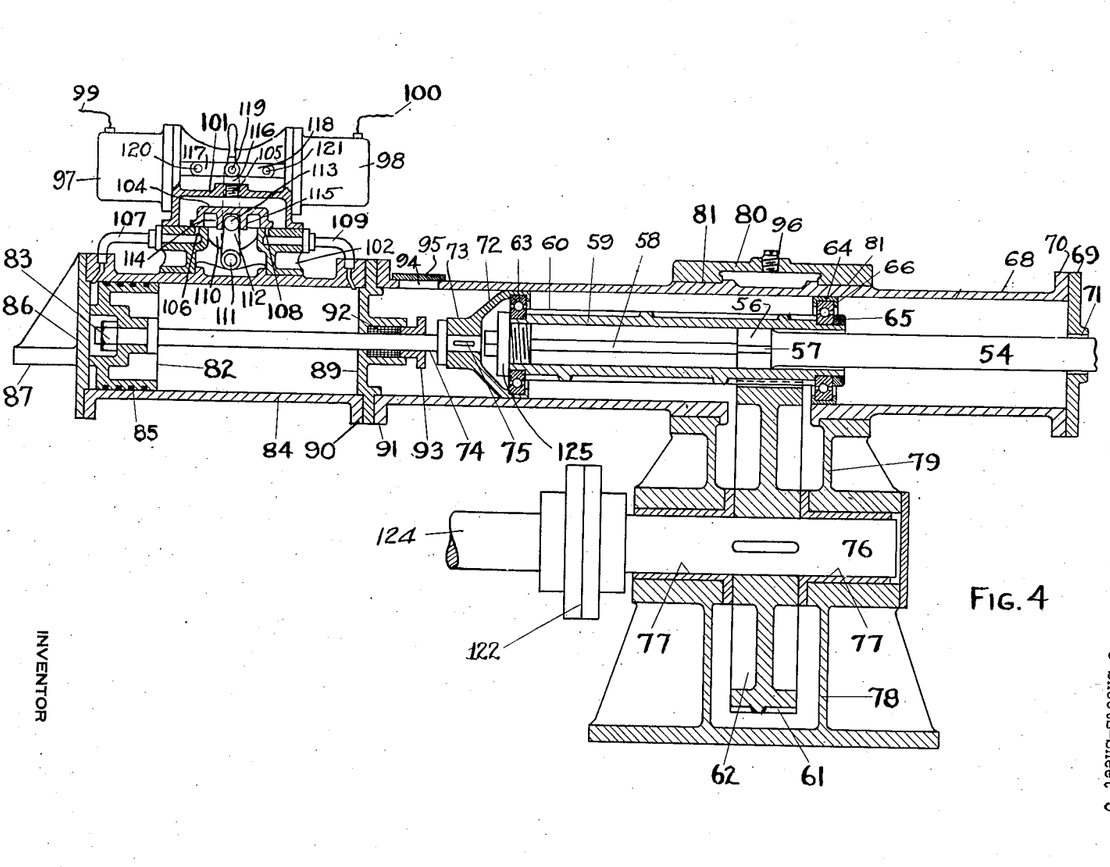
Fig. 4 is a sectional elevation through the shifting cylinder, valve, and special drive gears.

Referring to Figs. 1 and 4, the right end of the bed plate 1 carries a sub-base 50 for the driving motor 51, which is provided with a fly wheel 52.

The motor shaft 53 is coupled to a drive shaft 54 by a coupling 55. The shaft 54 has an enlarged end 56, provided with one or more flutes 57, which engage corresponding keyways 58 in the hollow driving pinion 59.

The pinion 59 is provided with single helical gear teeth 60, which engage corresponding single helical gear teeth 61, on the gear 62.

The hollow pinion 59 is mounted in a pair of deep groove ball bearings, 63 and 64. The inner race of the bearing 63 is clamped to the pinion 59 by a collared plug 125, screwed into the end of the pinion 59. The inner race of the bearing 64 is similarly clamped to the pinion 59 by a screwed collar 65, fitted to the end of the pinion 59.

The outer race of the bearing 64 is surrounded by a split brass collar 66, which is a sliding fit in the cylindrical bore 67 in the guide cylinder 68. An end plate 69 is secured to the flange 70, and provided with a hole 71 through which the shaft 54 passes.

The bearing 63 is mounted in a similar manner in a split frame 72 having a hub 73, which is secured to the end of the piston rod 74, by a key or cotter 75. The gear 62 is mounted on a shaft 76, set in bearings 77, in a three part gear case, of which 78, 79, and 80, indicate the bottom, middle, and top sections. These three sections are rigidly secured together.

The cylindrical guide 68 is firmly clamped between the sections 79 and 80, as indicated at 81. The piston rod 74 is secured to a piston 82 by a nut 83. The piston 82 fits in a cylinder 84, and is provided with the usual packing rings 85.

The left cylinder head 86 is provided with a bracket 87, which is secured to a bar 88, bolted to one of the housings 2. The cylinder 84 may be of the same bore as the cylindrical guide 68, and mounted in line therewith, as shown.

The cylinder head 89 is rigidly secured between the flange 90 on the cylinder 84, and the flange 91 on the cylindrical guide 68.

The cylinder head 89 is provided with a stuffing box 92, and a gland 93.

An opening 94 is formed in the cylindrical guide 68, for adjusting the gland 93, and is provided with a cover plate 95.

The opening 94 may also be used to supply oil for lubrication, and a second opening and a plug for this purpose is shown at 96. Numerals 97 and 98 indicate a pair of oppositely-disposed electro magnets, respectively supplied with current through the wires 99 and 100. The magnets 97 and 98 are secured to a valve cover 101, which is in turn secured to a valve bracket 102, mounted on the top of the cylinder 84.

The valve bracket 102 is provided with a flat valve seat 103, upon which is mounted a D valve 104.

Compressed air is supplied through the opening 105 above the valve 104. A port 106 through the valve seat 103, supplies air through a short pipe 107 to the left end of the cylinder 84, and a similar port 108, and pipe 109, supply air to the right end thereof. The exhaust air escapes through the opening 110. A short shaft 111 is mounted in bearings formed in the valve bracket 102, and this shaft carries a lever 112, whose upper end 113 extends between a pair of lugs 114, and 115, on the valve 104, to move the valve.

A second lever 116 is also mounted on the shaft 111, and connected at its upper end to links 117, and 118, by a pin 119. The link 117 is connected to the plunger of the magnet 97 by a pin 120, and the link 118 is connected to the plunger of the magnet 98, by a pin 121.

The magnet 97 pulls the valve 104 to the left, and thus supplies air to the right end of the cylinder 84, this air causing the piston 82, the piston rod 74, and the helical drive pinion 59, to move toward the left. The magnet 98 moves the valve 104 to the right, and the air pressure causes a movement of the piston 82, rod 74, and pinion 59, toward the right.

When the pinion 59 is shifted as above described, the driving flutes 57 slide in the keyways or grooves 58, thus maintaining the driving connection between the motor 51 and the pinion 59; and also the teeth 60 of the pinion 59, are in sliding engagement with the teeth 61 of the gear 62, which drives the lower drum shaft 6, through the shaft 76, the couplings 122, and 123, and the shaft 124.

Bearing in mind that the gear teeth 60 and 61 are single helical teeth, it will be apparent that an end motion of the pinion 59 will produce an angular advance, or retardation, of the shafts 76 and 6, and the connected drums 7 and 49, which carry the shear knives, which is a highly desirable result as will now be explained.

Referring to Figure 3, we may assume that the circumferential pitch of the shear knives is two feet. This figure of course may be widely varied, depending on the size and purpose of the machine, but it is a convenient figure for illustration.

With a knife pitch of two feet, and proper control for the knife magnets 36, the shear knives may be brought into cutting relation in any desired sequence, and lengths may be cut from the moving bar or strip, in any multiple of two feet.

To obtain cuts of an uneven length in feet, the number of knives could be doubled, and thus set closer together, or at one foot pitch.

For a heavy shear requiring heavy parts this might be impossible on account of lack of space, and even if space was available, it would double the cost of the knives, knife holder, magnets, and associated parts, and complicate the controls.

Other means to obtain cuts in odd feet, or broadly speaking in multiples of one half the knife pitch, are therefore desirable. One way to do this would be to mount the whole shear on a slide, and then after making a cut, move the shear to a new position on the slide.

Bear in mind that the drums 7 and 49 rotate continuously, and normally with their pitch diameters moving at the same surface speed as the moving bar of material to be cut. If now it was desired to cut 15 ft. sections, and a first cut was made at any point, a second cut could be made either 14 feet or 16 feet from the first cut, by selecting for operation the proper pair of knives. If, however, the shear was moved bodily one foot toward the oncoming strip (against its direction of motion); the position of the 14 foot cut with respect to the strip would have been increased to 15 feet.

Similarly, if after the first cut, the shear was moved one foot with the motion of the strip, the normal 16 ft. cut will have been reduced to 15 ft. with respect to the strip.

However, it is easier to accomplish this result by the means shown in Fig. 4 than by moving the whole machine. If the tangent of the helical angle of the teeth 60 and 61, is one half, or in the proportion of 1 to 2, then a longitudinal movement of the pinion 59 of two feet, will produce an angular movement of one foot measured on the pitch surface of the gear 62; and if the pitch diameter of the gear 62 is the same as the pitch diameter of the knife drums 7 and 49, then the knives will be advanced or retarded one foot, for each two feet end movement of the pinion 59.

This end shift of pinion 59 must be made between cuts, and in such a manner that the speed of the knives is kept equal to the speed of the bar or strip, at the instant of cutting.

These features are obtained by the mechanism shown in Fig. 4. It is obvious that instead of an air cylinder I might employ various well known forms of mechanism to shift the pinion 59, but the air cylinder shown has several advantages as follows:

1. It may be operated either quickly or slowly.
2. The stroke may be an exact amount and invariable.
3. The action may be cushioned by throttling the exhaust.
4. No change of gear ratio is required, as would be necessary for a rotating drive and finally,
5. The desired action may be exactly timed by light changeable contactors and the controls much simplified.

The effect produced by the end shift of pinion 59 in combination with the selection of various pairs of knives to cut is illustrated in Figs. 5 to 14.

Figure 14:
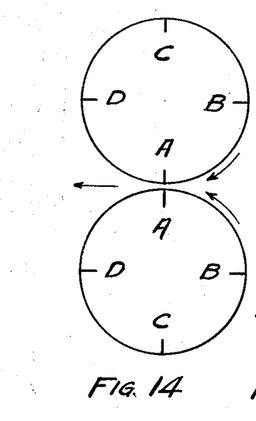
Fig. 14 is a diagram of two knife drums and their knives.

Fig. 14 is a diagrammatic elevation of a pair of co-acting shear drums as previously described. This figure illustrates the cutting diagrams Figs. 5 to 13 inclusive.

In Fig. 14, the knives of each co-acting pair are given the same letter A, B, C, or D.

Figures 5, 6, 7, 8, 9, 10, 11, 12, 13:
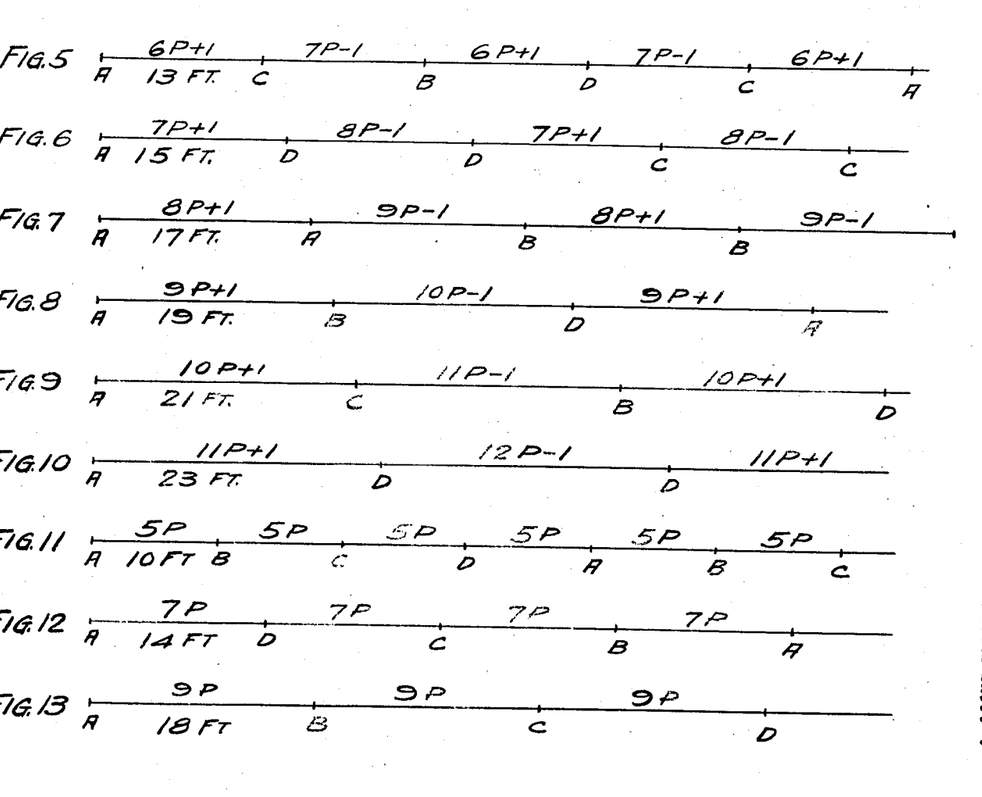
Figs. 5 to 13 inclusive are diagrams of different lengths of cut sections, showing the sequence of operation of the knives for different lengths cut.

Fig. 5 illustrates the method of cutting 13 foot sections from a bar of indefinite length, and shows also the sequence of action of the cutting knives. The first cut at the left end is assumed to be made by knives A, the first section may then be 6 knife pitches of 2 feet each, plus 1 foot, and is marked 6 P+1, and made by knives C.

The second section is 7 knife pitches of two feet, minus 1 foot, and the section is severed by knives B.

In order to traverse the pinion 59 back and forth across the face of the gear 62, between the cuts, the plus and minus increments of one foot each may alternate with each other, and Figs. 5 to 10 inclusive show this.

In Fig. 5, for 13 foot cuts the knife sequence will be in the order A—C—B—D—C—A—C—B—D—C—A—C—B—D—C etc. no matter which pair of knives makes the first cut.

This may be checked by counting the required number of pitches on Fig. 14.

Fig. 6 for 15 foot cuts shows that the cutting sequence is A—D—D—C—C, etc.

In Fig. 7 for 17 ft. cuts the cutting sequence is A—A—B—B etc.

In Fig. 8 for 19 ft. cuts the cutting sequence is A—B—D—A etc.

In Fig. 9 for 21 foot cuts the cutting sequence is A—C—B—D, etc.

Figs. 5 to 10 inclusive show cuts in odd feet, to make which, with knife pitches of 2 feet, the pinion 59 is alternately shifted for its full stroke of say 2 feet, between cuts.

Figs. 11, 12, and 13, show cuts in even feet, to make which the pinion 59 need not be shifted, so that for these cuts the air supply to cylinder 84 may be cut off.

Fig. 11 shows cuts of five knife pitches, or 10 feet, and the cutting sequence is A—B—C—D—A—B—C—D, etc.

Fig. 12 shows cuts of seven knife pitches or 14 feet, and the cutting sequence is A—D—C—B—A.

Fig. 13 shows cuts of 9 knife pitches or 18 feet, and the cutting sequence is A—B—C—D—A—B—C—D which is the same as for 10 ft. cuts.

The above examples show clearly that for cut off sections of any length, whether in odd or even feet, there is a definite repetitive sequence for the shear knives.

When these sequences for the desired cuts are determined, we can make contactors or contactor operating cams, which will automatically produce these cutting sequences by supplying current at proper intervals to the various knife magnets 36.

Figure 15:
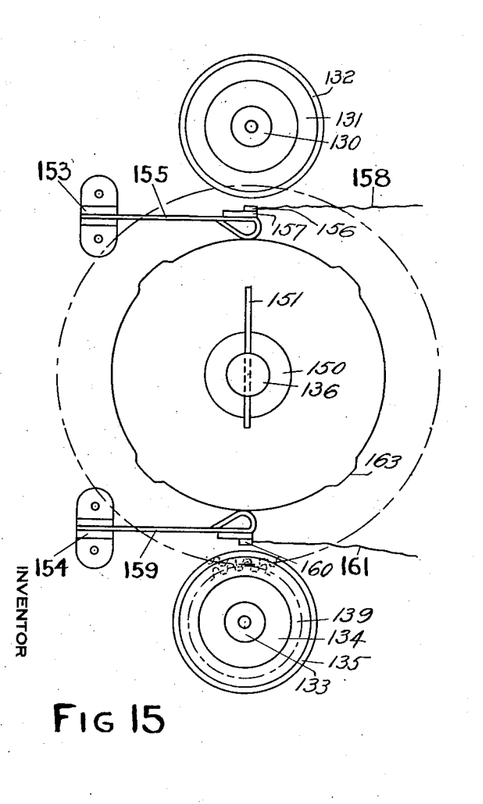
Figs. 15 and 16 are diagrammatic views of the electrically-operated control elements.
Figure 16:
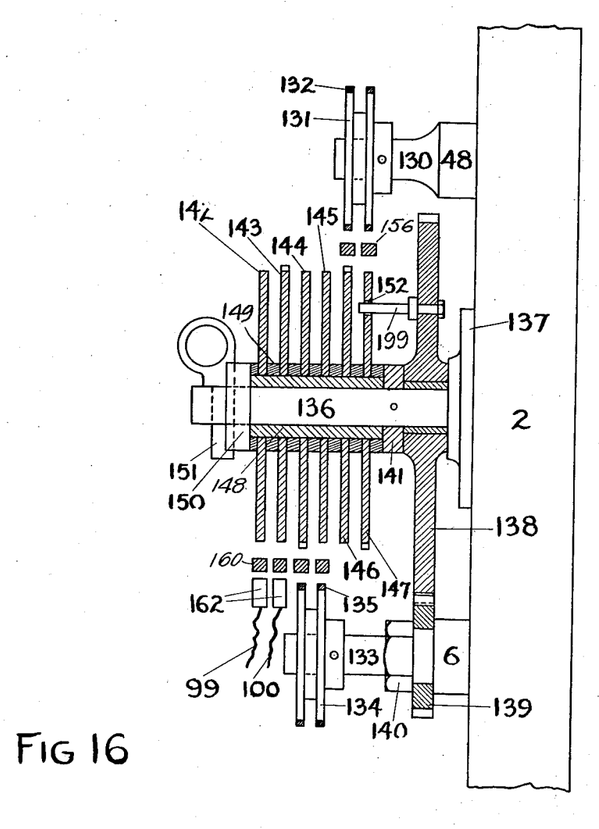

In Fig. 15 the upper drum shaft 48 has a reduced end 130, upon which is mounted an insulating disc 131, provided with two contact rings 132.

From each of these rings 132 a wire is led through a hole in the shaft 48, (not shown) to one set of knife magnets 36, on the drum 49.

The lower drum shaft 6 has a reduced end 133, which carries a similar disc 134, having the contact rings 135, for the two sets of magnets 36, on the drum 7.

A stationary pin 136 is secured to a flange 137, which is in turn fastened rigidly to the housing 2. The pin 136 carries a loosely mounted spur gear 138, which is driven by a second spur gear 139, secured to the lower drum shaft 6 by a nut 140.

These gears may have any convenient ratio, or additional gears may be used for higher ratios. On the pin 136 and outside the collar 141, I mount a nest of thin cams which may be conveniently made of sheet steel about ¼" thick. These cams are indicated at 142, 143, 144, 145, 146, and 147, and they are mounted on a tubular sleeve 148 between spacing collars 149. The cams 142 to 147, the sleeve 148, and the collars 149, may be spot welded to form an assembled unit.

A retaining collar 150 is slipped over the end of the pin 136, and held in place by a cotter key 151. The inner disc 147 has a single hole 152, which is engaged by a pin 199 secured to the gear 138, to rotate the cam unit.

A pair of supports 153, and 154, are secured to to the housing 2. The upper support 153 carries a pair of flat springs 155, which in turn each support a contact button 156, mounted on an insulator 157, and supplied with current by a wire 158.

Similar springs 159, buttons 160, and wires 161 are carried by the lower support 154.

There are two contact buttons 156, each supplying a collector ring 132. There are also two contact buttons 160, each supplying a collector ring 135.

There are also two contact buttons 160, each supplying a fixed contact 162, from which wires 99, and 100, lead respectively, to the valve magnets 97 and 98. (See Fig. 4).

Projections 163 may be formed on any or all of the cam members 142 to 147 inclusive of any desired size, spacing, or relationship, to automatically energize the various magnets in the proper sequence, and for the proper interval of time.

It will be noted that the sleeve 148 and the connected cams form a unit, which is readily removable from the pin 136, and further that it can only register with the pin 153 in one correct position.

It will be understood that there is a separate cam assemblage for each length of section the shear is designed to cut—if the machine is to cut 20 different lengths there will be twenty cam units.

It is further to be noted that the foregoing description applies to sections cut to lengths of uneven feet, or broadly speaking, to lengths which are a multiple of the knife pitch, plus or minus one-half the knife pitch.

When lengths are cut in even multiples of the knife pitch, the cam units will not be supplied with the cams 142 and 143, which control the current supply to the valve magnets 97 and 98, since the cylinder 84 is inoperative at such times.

So far as described, my improved flying shear comprises a plurality of co-acting pairs of cutting knives, together with automatic means for selecting the pair required to cut to produce given even lengths in feet, and additional automatic means for changing the angular relation of the knives to the moving bar being cut, in such a manner as to cut uneven lengths in feet.

It will be noted that I have, broadly speaking, provided means for advancing or retarding the knives between cuts, while keeping the speed of the knives synchronous with the speed of the moving bar at the instant of cutting.

So far, the mechanism disclosed operates automatically to advance and retard the knives, alternately, and in fixed amounts of one-half the knife pitch. It will be evident that if the stroke of the shifting helical pinion 59 be made adjustable so that it may be shifted at will for any portion of its stroke, the amount of the angular adjustment of the knives between cuts may be fixed thereby, and therefore that sections may be cut from the moving bar equal to any desired number of knife pitches; and that any desired fraction of the knife pitch may be thus added or subtracted from the set spacing of the knives, to produce cut sections of any desired length in feet, inches, and fractions of an inch, within the limits of the design, that is, between the maximum and minimum lengths of sections which may be cut.

A machine embodying these features is illustrated and described in a co-pending application by myself and another bearing Serial No. 479,322.

It will be noted that when the toggle joints described are straight they are entirely rigid, and further, that if multiple joints are used as shown in Fig. 1 any desired degree of strength may be obtained.

It will also be noted that the movable knife holders are not moved (radially) when under the cutting strain—the radial motion or adjustment takes place while the knife holder is traveling in a swing around its center of rotation, and the said radial motion is fully completed before the knife reaches the cutting position so that there will be only slight wear on the movable knife holders and their guides, and thus the accuracy of register between co-acting knives is easily preserved.

It will be also noted that since the knife drums are geared together in such a way (usually by equal gears) that the same pair of knives always co-act with each other, it follows that when any certain pair of co-acting knives reach the cutting position, they will be driven by the same co-acting pair of gear teeth at every revolution of the knife drums.

Therefore any usual commercial inaccuracy of the gears would not affect the proper register of the knives, since the latter can be shimmed to proper register in individual co-acting pairs, and this relation will remain constant.

I claim as my invention:

1. A rotary flying shear comprising a pair of rotary knife-carrying members each carrying one of a pair of coacting shear knives, a driving element rotating at a substantially constant speed, connections between said driving element and said knife-carrying members to transmit motion, and means for varying the angular relation between the driving element and the knife-carrying members in successive predetermined increments, while both are in motion.

2. A rotary flying shear comprising a pair of rotating knife carrying members, driven by a constantly engaged drive, and normally operated at a surface speed substantially equal to the speed of a bar to be severed which may pass between them, whereby the said knives would normally cut equal sections from the said bar of a length equal to predetermined multiples of the knife pitch, and means operatable after a cut has been made for angularly advancing or retarding the knife carrying members to vary the lengths cut, while at the same time maintaining the synchronous speeds of the bar and knives at the instant of cutting.

3. In a flying shear, a pair of rotary knife-carrying members rotating on fixed centers and provided with a pair of co-acting shear knives, power-operated means for positioning one of said knives to cut or not to cut, a continuously rotating member synchronized with the knife-carrying members, and a detachable cam driven by the said rotating member for controlling the operation of the said knife positioning means.

4. In a flying shear, a pair of rotary knife-carrying members rotating on fixed centers and provided with a pair of co-acting shear knives one of which is radially adjustable, magnet operated means for positioning one of the said shear knives to cut or not to cut, and a detachable cam member controlling the magnet circuit and driven in timed relation to the knife-carrying members, for controlling the intervals of current supply to the said magnets.

5. A rotary flying shear comprising a pair of rotary knife-carrying members arranged to rotate normally at a uniform surface speed equal to the lineal speed of a moving bar passing between them, a pair of co-acting shear knives, one of each of said knives being mounted on each of said drums whereby the said knives may cut at regular intervals due to their uniform rotary movement, means for radially adjusting one of said knives into and out of cutting relation with the other of said knives, and means for advancing said knives with reference to their normal travel between cuts in pre-determined increments, while maintaining the synchronous speeds of the bar and knives at the instant of cutting whereby sections may be cut from the moving bar of desired lengths other than the normal lengths due to the uniform rotation of the knife-carrying element.

6. A rotary flying shear comprising a pair of rotary knife-carrying members rotating on fixed centers and arranged to rotate normally at a uniform surface speed equal to the lineal speed of a moving bar passing between them, a pair of co-acting shear knives, one of each of said knives being mounted on each of said drums whereby the said knives would measure off regular spaces on the bar, means for radially adjusting one of the said knives to cause it to cut at any one of the said measured spaces, and means for angularly advancing or retarding the knives with reference to the moving bar to cause the knives to cut either before or after any of the division points of the said spaces.

7. A rotary flying shear comprising a pair of rotary knife-carrying members arranged to rotate normally at a uniform surface speed equal to the lineal speed of a moving bar passing between them, a pair of co-acting shear knives, one of each of said knives being mounted on each of said drums, and one of said knives being radially adjustable whereby the said knives may cut at regular intervals due to their uniform rotary movement, means for adjusting the said adjustable knife to cut or not to cut, means for rotating the said elements at a uniform surface speed during the cutting operation, and means for impressing on the knife-carrying members an increase or decrease in speed between the cuts to change the relation of the knives to the moving bar and thereby vary the lengths cut from the same.

8. A flying shear, comprising two knife carrying members, arranged to rotate on fixed centers with the cutting edges of the knives having a circumferential speed closely approximating the surface speed of the material to be cut, a knife rigidly fixed to one of the said members, and a co-acting knife on the other of said members, said second knife having a radial movement greater than the thickness of the material to be cut and being normally held in its inner or inoperative position, and magnet operated means for extending the radius of the path of the said movable knife to cause it to pass through the path of the material to sever the same.

9. A rotary flying shear comprising a pair of rotating knife carrying members, driven by a constantly engaged drive, and normally operated at a surface speed substantially equal to the speed of a bar to be severed which may pass between them, whereby the said knives would normally cut equal sections from the said bar of a length equal to some multiple of the knife pitch, means operatable after a cut has been made for angularly advancing or retarding the knife carrying members a set amount to vary the lengths cut, while at the same time maintaining the substantially equal speed of the bar and the knives at the instant of cutting, in combination with means for controlling the action of the knives to cut or not to cut in a predetermined sequence.

10. A rotary flying shear arranged to cut off sections of equal length from a moving metal bar, means for normally equalizing the speed of the cutting elements and that of the moving bar, including a variable speed electric motor, means for setting the machine to cut off sections of predetermined length from the shortest to the longest within its range, and means for changing the said setting to cut other lengths at will.

11. A rotary flying shear comprising a self-contained unit including knife carrying members, knives carried thereby, means for driving the said knife carrying members at a speed normally equal to that of the bar to be severed, means for causing the knives to cut or to remain inactive, means for controlling the intervals between cuts, means for occasionally advancing or retarding the knife carrying members between cuts with respect to the moving bar, to permit making cuts including fractional lengths of the knife pitch, and means for controlling the said advancing or retarding means.

12. In a flying shear, a pair of rotary knife-carrying members provided with one or more pairs of co-acting shear knives one knife of each pair being adapted to be projected toward the other into cutting relation therewith, means for automatically bringing the knives into cutting relation at predetermined points during rotation of said members for cutting sections from a moving bar in lengths of any multiple of the knife pitch, means for driving the knife-carrying members including a pair of single helical gears, and means for shifting one of the said gears, in the direction of its axis, to advance or retract the knife carrying members with reference to the moving bar being cut, in order to cut lengths between even multiples of the knife pitch.

13. In a flying shear, a pair of rotary knife-carrying members provided with a plurality of pairs of co-acting shear knives, means for automatically controlling the cutting sequence of the various pairs of knives as desired, driving means for the said knife carrying members including a pair of single helical spur gears, a fluid pressure cylinder connected to one of the said gears to shift it axially thereby advancing or retracting the knife carrying members, a valve controlling the action of the said cylinder, and automatic means for operating the said valve.

14. In a rotary flying shear, the combination of a pair of rotary knife carrying members between which a moving bar may be fed in order to sever it, a cutting knife carried by each of the said rotating members and co-acting to sever the bar, means for adjusting one of the said knives to cut or not to cut, means for driving the rotary knife carrying members at a surface speed normally equal to the speed of the moving bar, and means included in the said drive comprising a helical gear and a helical pinion meshing therewith, together with means for intermittently shifting the helical pinion across the face of its gear while running, to angularly advance or retard the cutting knives between cuts, and so vary the length of the sections cut.

15. A rotary flying shear comprising a pair of rotating members provided with co-acting shear knives, gearing connecting the said members to register the co-acting knives, a shaft in driving connection with one of said rotary members, a single helical gear fixed to said shaft, a wide face helical pinion in mesh with the said gear and axially adjustable with reference there to, means for driving said pinion, and means for axially shifting the same to angularly advance or retard the knife carrying members.

16. In a flying shear, a pair of rotary knife carrying members geared together and provided with a pair of co-acting shear knives, radially adjustable means for one of the said knives whereby it may be moved into or out of cutting relation with the other knife during the rotation of the knife carrying members, a primary drive connected to one of the said knife carrying members for driving it at a substantially constant speed in synchronism with the speed of a moving bar to be severed, means for operating the radially adjustable means at will, and supplementary means for angularly advancing or retarding the knife carrying members a maximum amount approximately equal to one-half the knife pitch between successive cuts and without affecting the smooth uniform speed of the primary drive, to enable the machine to cut sections from the moving bar of lengths intermediate multiples of the knife pitch.

17. In a flying shear, a pair of rotary knife carrying members provided with one or more pairs of co-acting shear knives, one knife of each pair being adapted to be projected toward the other into cutting relation therewith, means for automatically bringing the knives into cutting relation at predetermined points during rotation of the said members for cutting sections from a moving bar in length of any multiple of the knife pitch, a primary drive for rotating the said knife carrying members at a speed synchronized with the speed of the bar moving between them, and supplementary mechanism for impressing on the said driven members between cuts a plus or minus angular increment for enabling the machine to cut lengths intermediate of a multiple of the knife pitch.

18. In a rotary flying shear, a rotary member carrying a shear knife, a second rotary member co-acting with the first to shear a moving bar and provided with a guiding slot, a knife holder mounted in the said slot, a knife carried thereby, a toggle-joint for adjusting the said knife holder and knife into and out of cutting position, and means for operating the said toggle joint.

19. In a rotary flying shear, a rotary member carrying a shear knife, a second rotary member co-acting with the first to shear a moving bar and provided with a guiding slot, a knife holder mounted in the said slot, a knife carried thereby, a toggle-joint for adjusting the said knife holder and knife into and out of cutting position, and power operated automatically operating means for actuating the said toggle-joint.

20. A rotary flying shear for subdividing a strip of metal of indefinite length and while in continuous motion, into a number of sections of pre-determined length plus an indefinite remainder, including two rotary knife carrying drums and three or more co-acting pairs of cutting members arranged for non simultaneous cutting and spaced evenly around their carrying member, and means for bringing selected pairs of cutting members into cutting relation with the strip in succession comprising individual means for each co-acting pair of knives.

21. In a flying shear, a pair of rotary knife-carrying members provided with a plurality of pairs of co-acting shear knives, means for selectively projecting one of a pair of knives to make a cut at a predetermined point, means for angularly advancing the knife-carrying members in predetermined increments between successive cuts, and means for periodically resetting the said angular advancing means so the process may be repeated.

22. A rotary flying shear comprising a pair of rotating drums, rotating on fixed centers and each carrying a plurality of shear knives; each of the knives on one drum co-acting with a knife on the other drum, means for holding all the said shear knives out of cutting range, whereby a bar to be severed may be passed between the moving knives without effect, means for bringing successive selected pairs of knives into cutting relation to sever the bar, whereby sections may be severed of lengths in even multiples of the knife spacing, and means for varying the angular relation of the knives with reference to a fixed cutting point, while keeping the rotative speed the same as the speed of the bar at the instant of cutting, whereby lengths may be cut intermediate multiples of the knife spacing.

23. A rotary flying shear including in combination a pair of rotary knife carrying members geared together, each of said rotary members being provided with two or more shear knives and each of the same being in co-operative relation with a knife on the opposite rotary carrying member, and one knife of each co-acting pair being radially adjustable, a magnet controlling the cutting action of each radially movable knife and a detachable cam driven in timed relation to the knife carrying members for controlling the current supply to the several magnets which are required to operate in a definite sequence to cut sections of a predetermined length from a moving bar passing between the rotary members, whereby various lengths of cut sections can be cut from similar bars by substituting control cams to produce the required sequences of knife cuts.

24. A flying shear, comprising two knife carrying members, arranged to rotate on fixed centers with the cutting edges of the knives having a circumferential speed closely approximating the surface speed of the material to be cut, a knife rigidly fixed to one of the said members, and a coacting knife on the other of said members, said second knife having a radial movement greater than the thickness of the material to be cut and being normally held in its inner or inoperative position, and means automatically operable at predetermined intervals for extending the radius of action of the said movable knife to pass through the path of the material to sever the same, in combination with additional pairs of knives similarly disposed, and selective means adapted to select the knives to make the cuts in a number of predetermined sequences to obtain various cut lengths.

25. A rotary flying shear having a plurality of constantly rotating co-acting pairs of cutting knives, means for radially adjusting at least one knife of each co-acting pair, to cut or not to cut, without changing the radial adjustment of any knife of any other pair, means for causing the various knives to cut off sections of predetermined length from a moving bar, and electrically operated means for controlling the said length controlling means.

26. In a rotary flying shear, the combination of two parallel rotary knife carrying members, or drums, rotating on fixed centers and geared together, and between which a moving bar may pass; four evenly spaced shear knives mounted on each drum and comprising two rigidly mounted knives and two radially adjustable knives on each drum, each of the said adjustable knives being set in co-operative relation with a rigidly mounted knife on the opposite drum, power operated means for bringing each of the adjustable knives into cutting relation with its co-acting rigid knife, and automatic means for controlling the cutting action of the various pairs of knives in a desired sequence to vary the lengths of the cut sections.

27. In a rotary flying shear, the combination of two parallel rotary knife carrying members, or drums, rotating on fixed centers and geared together, and between which a moving bar may pass; four evenly spaced shear knives mounted on each drum and comprising two rigidly mounted knives and two radially adjustable knives on each drum, each of the said adjustable knives being set in co-operative relation with a rigidly mounted knife on the opposite drum, electro magnets for bringing each of the adjustable knives into cutting relation with its co-acting rigid knife, and automatic contactors for supplying current to each of the said knife magnets to cause the various pairs of co-acting knives to cut in a desired sequence to vary the length of the sections cut from the moving bar.

28. In a rotary flying shear, the combination of two parallel rotary knife carrying members, or drums, rotating on fixed centers and geared together, and between which a moving bar may pass; four evenly spaced shear knives mounted on each drum and comprising two rigidly mounted knives and two radially adjustable knives on each drum, each of the said adjustable knives being set in co-operative relation with a rigidly mounted knife on the opposite drum, electro magnets for bringing each of the adjustable knives into cutting relation with its co-acting rigid knife, and automatic contactors for supplying current to each of the said knife magnets to cause the various pairs of co-acting knives to cut in a desired sequence to vary the length of the sections cut by whole multiples of the knife spacing, and means for advancing or retarding the knives between cuts with reference to the moving bar to cut sections of a length including a fraction of the knife pitch.

29. A flying shear for cutting a moving metal bar or strip into sections of uniform length with an indefinite remainder, comprising several pairs of coacting knives mounted to rotate on fixed centers, means whereby a first cut is made by some one pair of knives at random, and means automatically operating after the first cut to select the succeeding pairs to cut in a sequence to give the required lengths of sections.

30. A flying shear for cutting equal length sections from a moving bar and comprising a pair of rotary knife carrying members, a plurality of co-acting shear knives mounted on each of the said members, certain of the said knives being radially adjustable to cut or not to cut, electrically operated mechanism for effecting such radial adjustment of the said knives means for driving the knife carrying members at a speed substantially equal to the lineal speed of the bar to be cut, means for advancing or retarding the knives with relation to the bar between cuts, to vary the cut lengths, electrically controlled means to operate the said advancing means, detachable contactor cams for energizing the various electric control circuits, and means for securing the said cams for any certain length of cut section together in fixed relation to each other to form a quickly detachable unit for substitution when setting the machine for a change in length of the sections to be cut.

WALTER W. MACFARREN.